(12) United States Patent
Gilfix et al.

(10) Patent No.: US 7,133,963 B2
(45) Date of Patent: *Nov. 7, 2006

(54) CONTENT ADDRESSABLE DATA STORAGE AND COMPRESSION FOR SEMI-PERSISTENT COMPUTER MEMORY

(75) Inventors: Michael Gilfix, Austin, TX (US); Anthony N. Liguori, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/728,171

(22) Filed: Dec. 3, 2003

(65) Prior Publication Data

US 2005/0125599 A1    Jun. 9, 2005

(51) Int. Cl.
G06F 12/02 (2006.01)
G06F 17/30 (2006.01)
(52) U.S. Cl. .................... 711/108; 707/3; 707/101
(58) Field of Classification Search ............. 711/113, 711/170, 207, 108; 707/8, 3, 101; 709/203; 341/51
See application file for complete search history.

(56) References Cited

U.S. PATENT DOCUMENTS

| | | | | |
|---|---|---|---|---|
| 4,641,274 A | | 2/1987 | Swank ................. 715/531 |
| 5,179,378 A | * | 1/1993 | Ranganathan et al. ...... 341/51 |
| 5,479,654 A | | 12/1995 | Squibb ................... 707/201 |
| 5,504,895 A | * | 4/1996 | Kurosawa et al. ............ 707/8 |
| 5,696,927 A | * | 12/1997 | MacDonald et al. ........ 711/207 |
| 5,721,907 A | | 2/1998 | Pyne ..................... 707/201 |
| 5,832,520 A | | 11/1998 | Miller ................... 707/203 |
| 5,978,805 A | | 11/1999 | Carson ................... 707/204 |
| 6,061,714 A | * | 5/2000 | Housel et al. ............ 709/203 |
| 6,088,694 A | | 7/2000 | Burns et al. ............. 707/204 |
| 6,307,488 B1 | * | 10/2001 | Cooper .................... 341/51 |
| 6,311,187 B1 | | 10/2001 | Jeyaraman ............... 707/204 |
| 6,516,397 B1 | * | 2/2003 | Roy et al. ............... 711/170 |
| 6,535,894 B1 | | 3/2003 | Schmidt et al. .......... 707/204 |
| 6,968,424 B1 | * | 11/2005 | Danilak .................. 711/113 |
| 2001/0044910 A1 | | 11/2001 | Ricart et al. | |
| 2002/0120791 A1 | | 8/2002 | Somalwar et al. | |
| 2002/0163882 A1 | | 11/2002 | Bornstein | |
| 2003/0078959 A1 | | 4/2003 | Yeung et al. | |
| 2005/0091234 A1 | * | 4/2005 | Hsu et al. ............... 707/100 |

* cited by examiner

*Primary Examiner*—Pierre Bataille
*Assistant Examiner*—Paul Schlie
(74) *Attorney, Agent, or Firm*—John Biggers; Herman Rodriguez; Biggers & Ohanian, LLP

(57) ABSTRACT

Content addressable data storage and compression for semi-persistent computer memory including providing a chunk of data that is a quantity of input data; retrieving a memory block from semi-persistent computer memory; searching for a segment of the chunk that matches the memory block; and if a matching segment is found: discarding the matching segment; providing a retrieval key for the memory block as a retrieval key for the matching segment; identifying an unmatched portion of the chunk that does not match the memory block; identifying a free memory block of a file system; storing the unmatched portion semi-persistently in the free memory block; and providing a retrieval key for the unmatched portion.

33 Claims, 7 Drawing Sheets

CONTENT ADDRESSABLE DATA STORAGE AND COMPRESSION FOR SEMI-PERSISTENT COMPUTER MEMORY

BACKGROUND OF THE INVENTION

1. Field of the Invention

The field of the invention is data processing, or, more specifically, methods, systems, and products for content addressable data storage and compression for semi-persistent computer memory.

2. Description Of Related Art

Content addressable storage, sometime called associative storage, is a kind of computer memory storage in which items of data are stored and retrieved by analysis of their content rather than by fixed memory addresses or locations. Traditional approaches to content addressable storage confront a dilemma: content addressable methods can be efficient in terms of CPU utilization if they use fixed memory block sizes, but using a fixed memory block size is an inefficient use of underlying storage media. Traditional methods of content addressable storage also typically do not provide for data compression, although, in terms of efficient use underlying storage media, it would be beneficial if they did. Hard drives are almost always underutilized. Performance for many applications can be improved by providing semi-persistent storage based upon underutilized disk drive memory, that is, memory not allocated to any file or inode in a traditional file system. There are at least two classes of affected applications storage requirements: persistent storage of critical data such as data files, configuration information, and the like, and semi-persistent storage of optimization data such as database indices, file system caches, network caches, and so on. In order to insure that needs are met for the first class of storage, the second class of storage is often given very finite storage limitations that do not correspond to the amount of free space that may actually be available. There is therefore an ongoing need for improvement in the area of semi-persistent memory storage.

SUMMARY OF THE INVENTION

Methods, systems, and products are disclosed for semi-persistent storage that coexists with persistent storage and makes available to applications full utilization of available free memory space. Semi-persistent memory is implemented generally by use of content addressable memory with data compression. A content addressable storage system according to the present invention typically supports data integrity checks with unique keys so that the integrity of every byte of semi-persistent storage is verifiable at any time. A persistent storage system such as a file system generally retains the ability to overwrite semi-persistent storage at any time.

More particularly, methods, systems, and products are disclosed for content addressable data storage and compression for semi-persistent computer memory including providing a chunk of data that is a quantity of input data; retrieving a memory block from semi-persistent computer memory; searching for a segment of the chunk that matches the memory block; and if a matching segment is found: discarding the matching segment; providing a retrieval key for the memory block as a retrieval key for the matching segment; identifying an unmatched portion of the chunk that does not match the memory block; identifying a free memory block of a file system; storing the unmatched portion semi-persistently in the free memory block; and providing a retrieval key for the unmatched portion. In many embodiments, a free memory block of a file system has a block size at least as large as a maximum memory block size. In typical embodiments, storing the unmatched portion semi-persistently in the free memory block includes storing the unmatched portion without recording the use of the free memory block in the file system.

In typical embodiments, identifying a free memory block of a file system includes reading a block identification from a free block list of a file system and storing the unmatched portion semi-persistently in the free memory block includes leaving the block identification unchanged in the free block list of the file system. In many embodiments, searching for a segment of the chunk that matches the memory block includes searching at a repeating memory interval through a search section of the chunk for a segment of the chunk that matches the memory block. In such embodiments, searching at a repeating memory interval through a search section of the chunk for a segment of the chunk that matches the memory block includes: calculating a weak checksum for the memory block; calculating weak checksums for segments of the search section of the chunk; comparing the weak checksums for the segments with the checksum for the memory block; and if a segment is found with a weak checksum equal to the weak checksum of the memory block: calculating a strong checksum for the memory block; calculating a strong checksum for the segment with the matching weak checksum; comparing the strong checksum of the memory block and the strong checksum for the segment with the equal weak checksum; and determining that the search has found a segment having contents that match the contents of the memory block if the strong checksum of the memory block and the strong checksum for the segment with the matching weak checksum are equal.

In typical embodiments, storing the unmatched portion of the chunk includes storing the unmatched portion of the chunk as a new memory block having a memory block size equal to the size of the unmatched portion of the chunk. When searching for a segment of the chunk that matches the memory block fails to find a matching segment, embodiments typically include repeatedly carrying out the following steps for all memory blocks in computer memory until a matching segment is found: retrieving a next memory block from computer memory and searching for a segment of the chunk that matches the next memory block. When no matching segment is found in any memory block in computer memory, embodiments typically include: identifying a free memory block of a file system; storing a search section of the chunk semi-persistently in the free memory block; and providing a retrieval key for the search section of the chunk.

In typical embodiments, storing a search section of the chunk includes storing the search section of the chunk as a new memory block having a memory block size equal to the size of the search section of the chunk. In typical embodiments, providing a retrieval key for a search section of a chunk includes: calculating a weak checksum for the search section of the chunk and calculating a strong checksum for the search section of the chunk.

Typical embodiments include receiving a retrieval key; identifying a memory block in dependence upon the retrieval key; retrieving the identified memory block; and verifying (522) the contents of the memory block. In such embodiments, the retrieval key (512) for the memory block (506) typically is implemented as a unique key calculated with an algorithm that generates a unique key from the contents of a memory block and verifying (522) the contents of the memory block further includes: calculating (524) a new key for the memory block with the same algorithm and comparing (526) the retrieval key and the new key.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for content addressable data storage and compression for semi-persistent computer memory. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Content Addressable Data Storage and Compression

Figure 1:
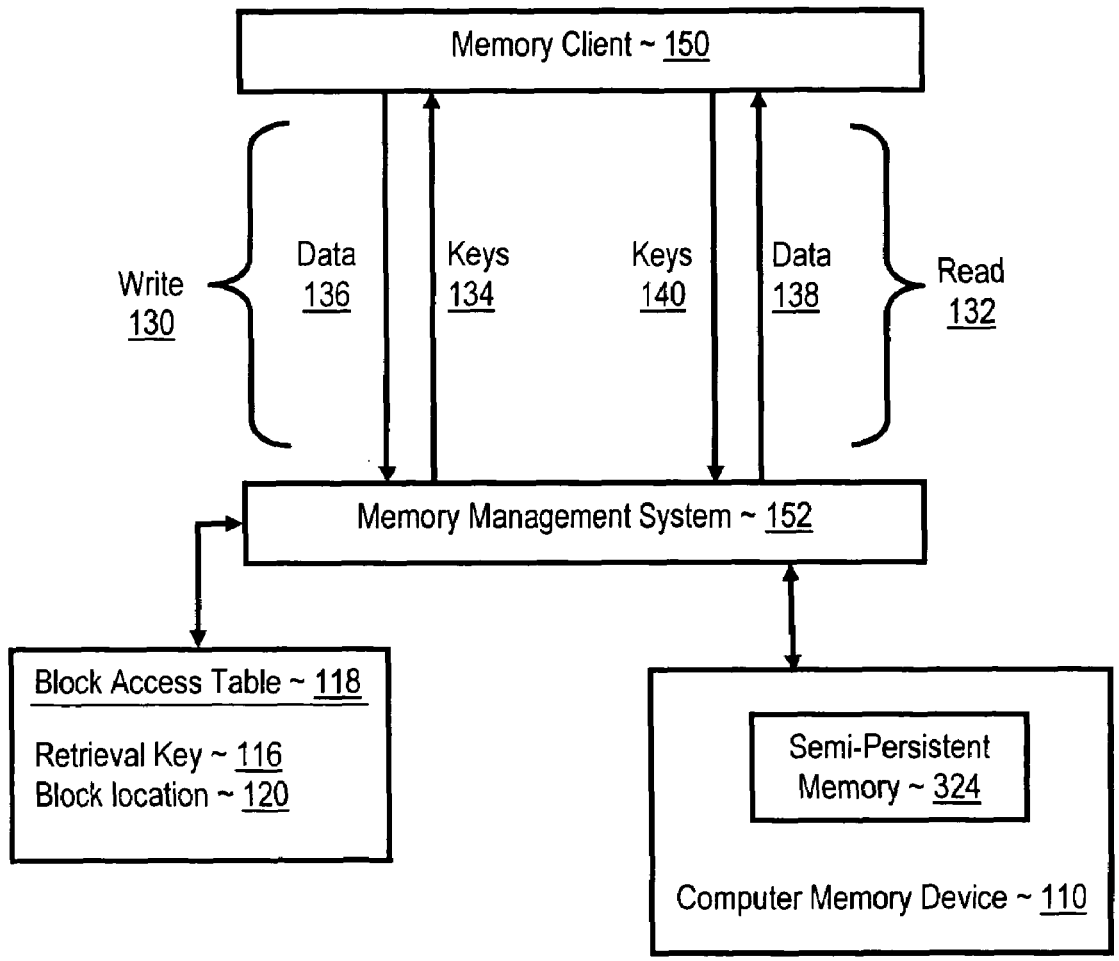
FIG. 1 sets forth a block diagram of an exemplary architecture in which may be implemented content addressable data storage and compression for semi-persistent computer memory according to embodiments of the present invention.

Methods, systems, and products for content addressable data storage and compression for semi-persistent computer memory are explained with reference to the accompanying drawings, beginning with FIG. 1. FIG. 1 sets forth a block diagram of an exemplary architecture in which may be implemented content addressable data storage and compression for semi-persistent computer memory according to embodiments of the present invention. The architecture of FIG. 1 includes a memory client (150) and a memory management system (152). Memory client (150) is any aggregation of computer hardware or software that writes to or reads from computer memory, traditional file system memory as well as semi-persistent memory. Examples of memory clients include, for example, hardware input/output adapters, device drivers, file systems, operating systems, applications programs, and so on, as will occur to those of skill in the art.

Memory management system (152) is a combination of computer hardware and software that implements methods for content addressable data storage and compression for semi-persistent computer memory according to embodiments of the present invention. Memory management system (152) operates to write (130) data to semi-persistent computer memory (324) and to read (132) data from semi-persistent computer memory. In writing (130) data to semi-persistent computer memory, memory management system (152) receives data (136) typically through an input stream and returns to its writing memory client (150) retrieval keys (134) that the client can later use to read the written data back from memory. In reading (132) data from semi-persistent computer memory, memory management system (152) receives from a reading memory client (150) a stream of retrieval keys (140) and returns to the client data (138) previously written to memory.

In the example of FIG. 1, memory management system (152) uses computer memory device (110) for actual data storage. Computer memory device (110) is implemented as any form of computer memory that can be both written and read, including, for example, random access memory, electrically erasable programmable read only memory ('EEPROM' or 'flash memory'), read/write optical memory, magnetic disk drives, and so on as will occur to those of skill in the art. To track the actual location in memory of memory blocks associated with retrieval keys, memory management system (152) maintains block access table (118) relating retrieval keys (116) and memory block locations (120).

Figure 2:
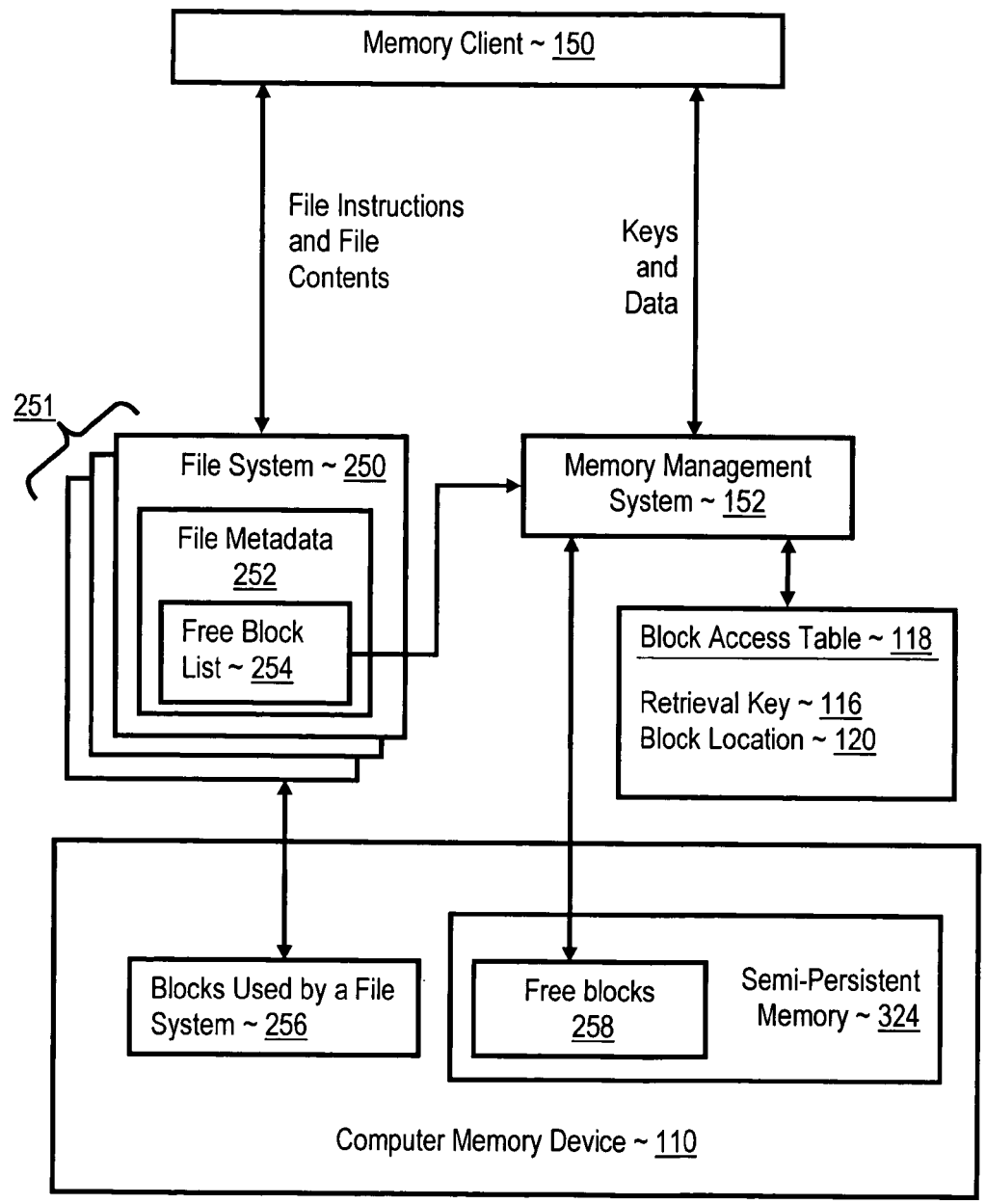
FIG. 2 sets forth a block diagram of a further exemplary architecture in which may be implemented content addressable data storage and compression for semi-persistent computer memory according to embodiments of the present invention.

FIG. 2 sets forth a block diagram of a further exemplary architecture in which may be implemented content addressable data storage and compression for semi-persistent computer memory (324) according to embodiments of the present invention. In FIG. 2, memory client (150) uses memory allocated from a file system (250) as well as semi-persistent memory made available through memory management system (152). "File system" means any system and method for storing files in memory according to the requirements of any operating system, including Unix, Linux, VMS, MVS, DOS, Windows NT™, and others as will occur to those of skill in the art.

Computer memory device (110) stores both memory blocks allocated for use by a file system (256) and free memory blocks (258) used for semi-persistent memory storage. A "memory block" is a unit of memory allocation. The term is used in this specification to refer to units of memory allocation in semi-persistent memory as well as file system memory according to the requirements of an operating system. In the terminology of the Unix and the Linux operating systems, for example, memory blocks are called "blocks." In the terminology of DOS, however, memory blocks are called "sectors," and in the terminology of Windows NT™, memory blocks are called "clusters." This specification uses the term "memory blocks" generically, to refer to units of memory allocation regardless of operating system or file system type. A "free memory block" is a memory block of a file system not allocated to a file and therefore available for use as semi-persistent computer memory. Such a free memory block may be allocated to a file after it is placed in use as semi-persistent memory and therefore overwritten, which is why such memory utilization is called "semi-persistent."

The architecture of FIG. 2 includes one or more file systems (251) each of which has file metadata (252) and a free block list (254). In some Unix file systems, for example, file metadata is maintained in a 'super block' that in turn identifies 'inodes' representing files and contains a list of free memory blocks available for use as memory storage space for files. In NTFS files systems under Windows NT, for a further example, file metadata is maintained in a special file called a "master file table." In the example of FIG. 2, memory management system (152) identifies free memory blocks (258) by reading from a free block list (254) in file metadata (252) of a file system (250). Memory management system (152) does not signify in any way to the file system that a free memory block has been used as semi-persistent storage. The file system continues to view the free memory block as a block that is available for use by the file system at any time. The file system remains free to use the free memory block by overwriting any data that has been written in the free memory block as semi-persistent memory.

Figure 3:
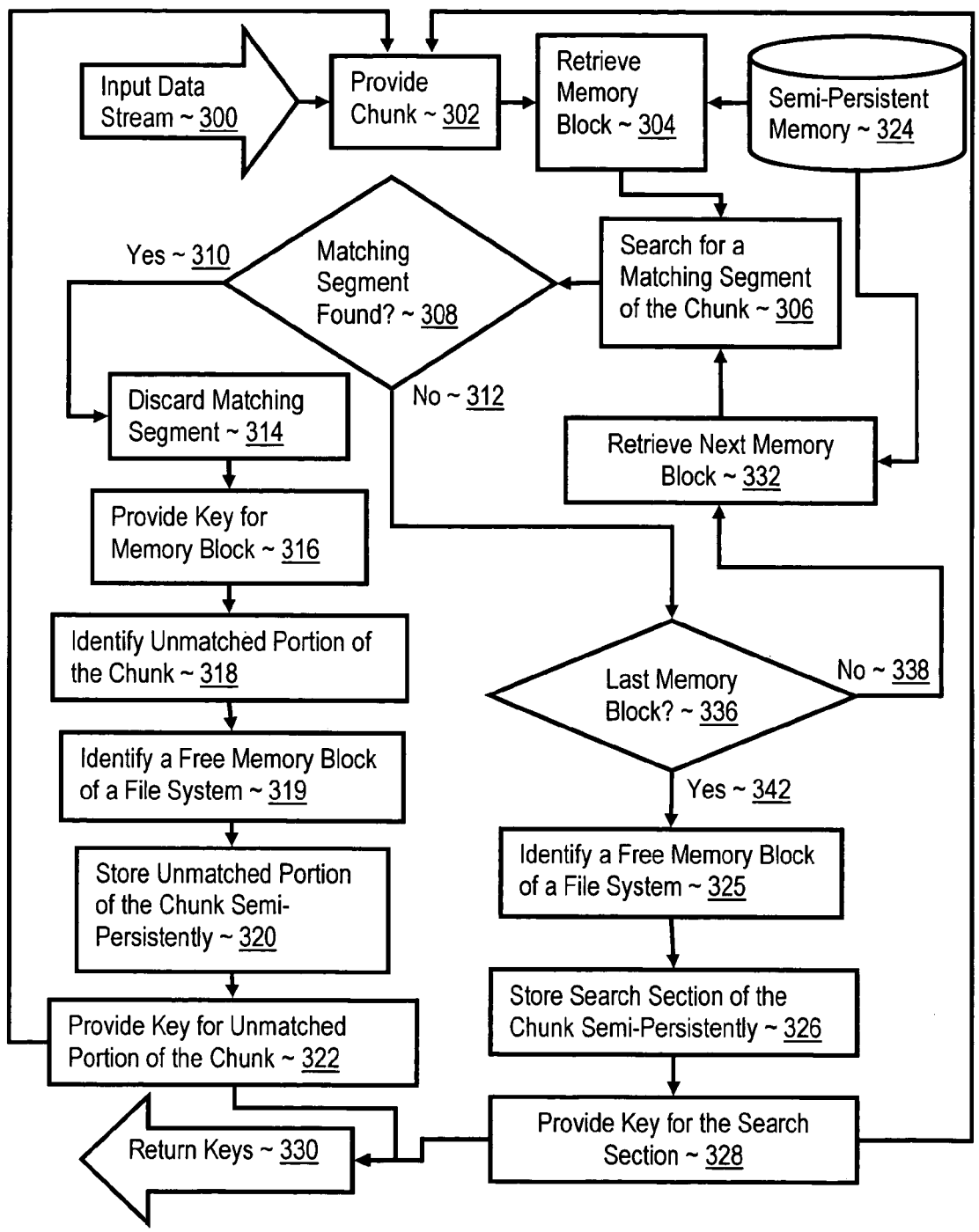
FIG. 3 sets forth a flow chart illustrating an exemplary method of content addressable data storage and compression for semi-persistent computer memory.

FIG. 3 sets forth a flow chart illustrating an exemplary method of content addressable data storage and compression for semi-persistent computer memory that includes providing (302) a chunk of data comprising a quantity of input data. Semi-persistent computer memory (324) and the method of FIG. 3, in providing content addressable data storage and compression, are configured to operate with a maximum memory block size for data to be compressed and stored in semi-persistent computer memory. A "chunk" is an input quantity of memory to be processed for storage and compression by searching it for matching memory segments according to embodiments of the present invention. In order to support searching through a chunk for a matching segment that is the same size as a memory block under comparison, a chunk in the method of FIG. 3 advantageously has a chunk size that is larger than the maximum block size.

At startup, providing (302) a chunk generally is carried out by retrieving from input a quantity of input data for storage and compression having a chunk size larger than the maximum memory block size. In many embodiments, providing (302) a chunk at startup may include retrieving from input a quantity of input data for storage and compression having a predetermined minimum chunk size larger than the maximum memory block size. In some exemplary embodiments of the method of FIG. 3, a predetermined minimum chunk size is set to twice the maximum memory block size, advantageously supporting searches of chunks for memory blocks of the maximum size so that no more than one match may occur during each search loop. In addition to startup processing, there are circumstances in the method of FIG. 3, discussed in more detail below, in which providing a chunk is carried out by retrieving from input a quantity of data of any size less than a predetermined maximum, including for example, after providing a key for unmatched portion of a chunk (322) and after providing a key for a stored search section of a chunk (328).

The method of FIG. 3 includes retrieving (304) a memory block from semi-persistent computer memory (324) and searching (306) for a segment of the chunk that matches the memory block. In the method of FIG. 3, retrieving (304) a memory block from semi-persistent computer memory (324) is carried out by retrieving from semi-persistent computer memory a memory block having a memory block size no greater than a maximum memory block size. That is, a retrieved memory block in this example may have any memory block size not larger than a maximum memory block size as predetermined for any particular embodiment.

In the example of FIG. 3, searching (306) for a segment of a chunk that matches a memory block includes searching at a repeating memory interval through a search section of the chunk for a segment of the chunk that matches the memory block. In many embodiments, the memory interval is set to one bit, although that is not a limitation of the invention. In other embodiments, the repeating memory interval for search may be set to any useful memory interval as will occur to those of skill in the art, two bits, one nibble, one byte, one memory word, a double word, and so on.

Figure 4:
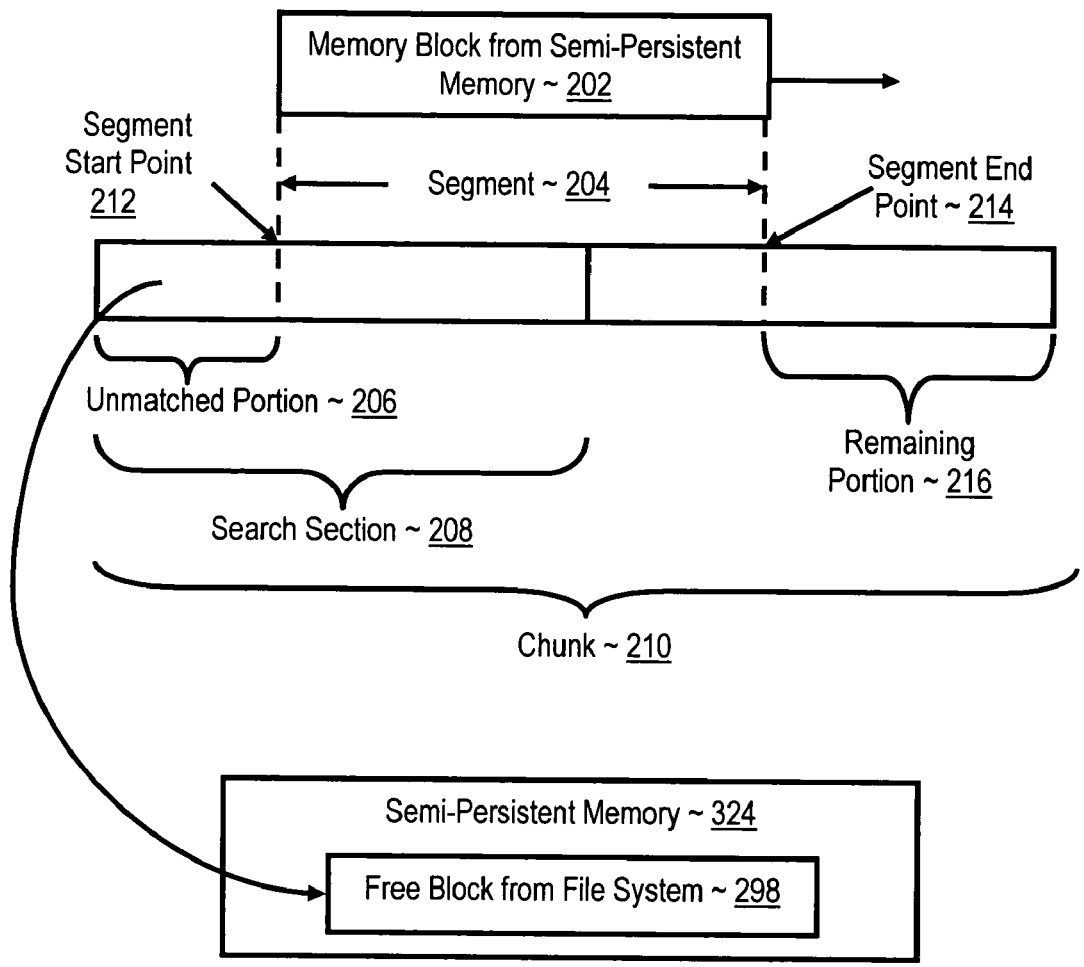
FIG. 4 sets forth a line drawing illustrating an exemplary search for a segment of a chunk that matches a memory block.

Searching (306) for a segment of a chunk that matches a memory block is explained further with reference to FIG. 4. FIG. 4 sets forth a line drawing illustrating an exemplary search for a segment of a chunk that matches a memory block. In the example of FIG. 4, memory block (202) has been retrieved and a search for a matching segment (204) of chunk (210) is carried out by beginning at the beginning at the first segment of the chunk and comparing the memory block with each segment having a segment start point inside the search section (208) of the chunk.

In this example, the chunk size is one kilobyte, 1024 bytes, the maximum memory block size for the embodiment is set to 512 byes, the memory block under comparison is assumed to have a memory block size of the maximum, 512 bytes, and the repeating memory interval for the search is set to one bit. The bits in the chunk are numbered from 1 through 1024*8=8192. Each segment to be compared with the memory block in this exemplary search then is 4096 bits in size, and the segments to be compared overlay one another beginning with a first segment whose segment start point is at chunk bit 1 and whose segment end point is at chunk bit 4096. A second segment has a segment start point at chunk bit 2 and a segment end point at chunk bit 4097. A third segment has a segment start point at chunk bit 3 and a segment end point at chunk bit 4098. And so on, through the last segment in the search section (208) of the chunk whose segment start point at chunk bit 4096 and a segment end point at chunk bit 8191.

Figure 5:
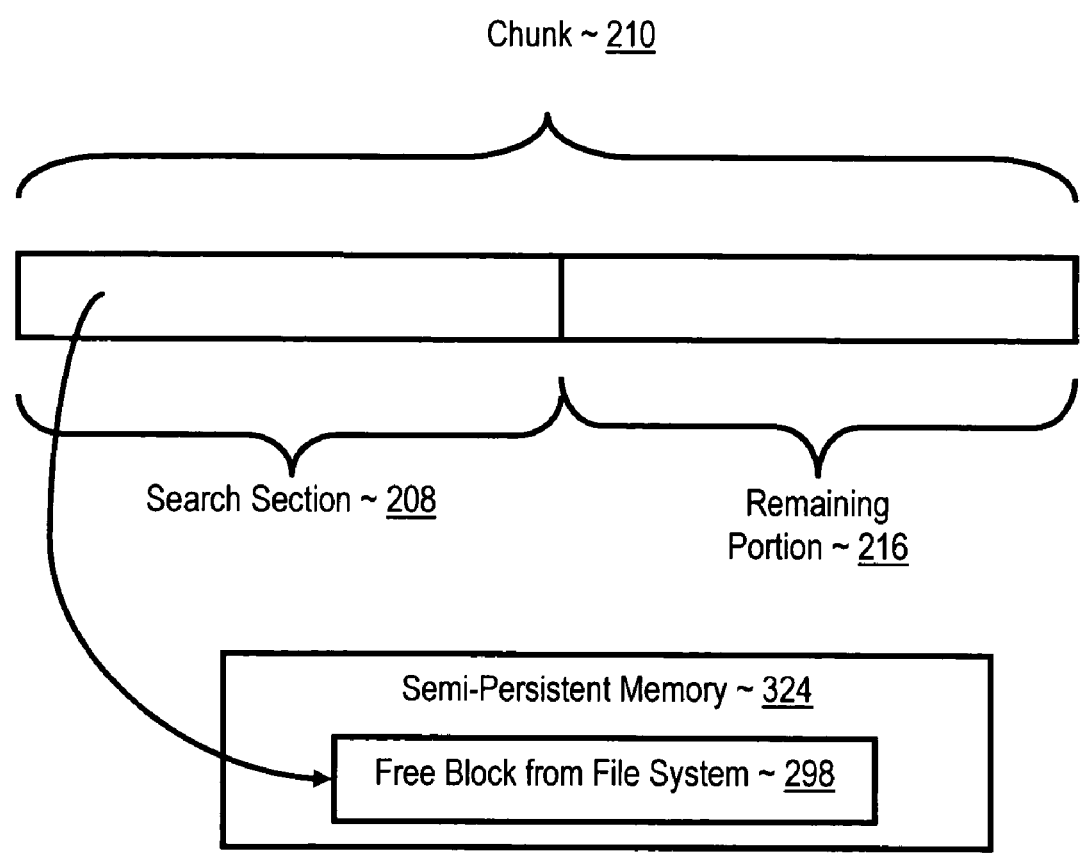
FIG. 5 sets forth a line drawing illustrating an exemplary search for a segment of a chunk that matches a memory block on the assumption that in searching through the chunk, no matching segment was found.

The use of a search section (208) is explained further with reference to FIG. 5. FIG. 5 sets forth a line drawing illustrating an exemplary search for a segment of a chunk that matches a memory block on the assumption that in searching through chunk (210), no matching segment was found. This search was similar to the search of FIG. 4, a one-kilobyte chunk with a 512 byte memory block for comparison. In this example, where no match was found, the entire search section (208) is broken off from the chunk, keyed, and then stored in memory as a new memory block. The segment (216) with a segment start point at chunk bit 4097 and a segment end point at chunk bit 8192, now taken as the "remaining portion," if no matching segment is found in the chunk under comparison, is also taken as the first segment in a next search section for a next chunk—where in that next chunk the segment will be deemed to have a segment start point at chunk bit 1 and a segment end point at chunk bit 4096.

In the example of FIG. 4, if it is assumed that a search has resulted in finding a matching segment (204), having segment start point (212) at chunk bit 800 and a segment end point (214) at chunk bit 4896, then the portion of the chunk from bit 1 through bit 799 is an unmatched portion (206) of the chunk to be keyed and stored in a free memory block (298) of a file system as a new memory block in semi-persistent memory (324). The matched segment (204) is to be keyed with the same key as the memory block (202) it matches and then discarded, because a memory block (202) matching the segment (204) is already stored in memory. The remaining portion (216) of the chunk, that is, the portion remaining after the unmatched portion is stored and the matched segment is discarded, is used to form the beginning of a next chunk for comparison, as described in more detail below. Because an unmatched portion (206) of a chunk may be as large as the maximum size of memory block permitted in a semi-persistent memory, the maximum memory block size in semi-persistent memory, in many embodiments, is advantageously selected so that a free memory block of a file system has a block size at least as large as a maximum memory block size of semi-persistent computer memory.

Figure 6:
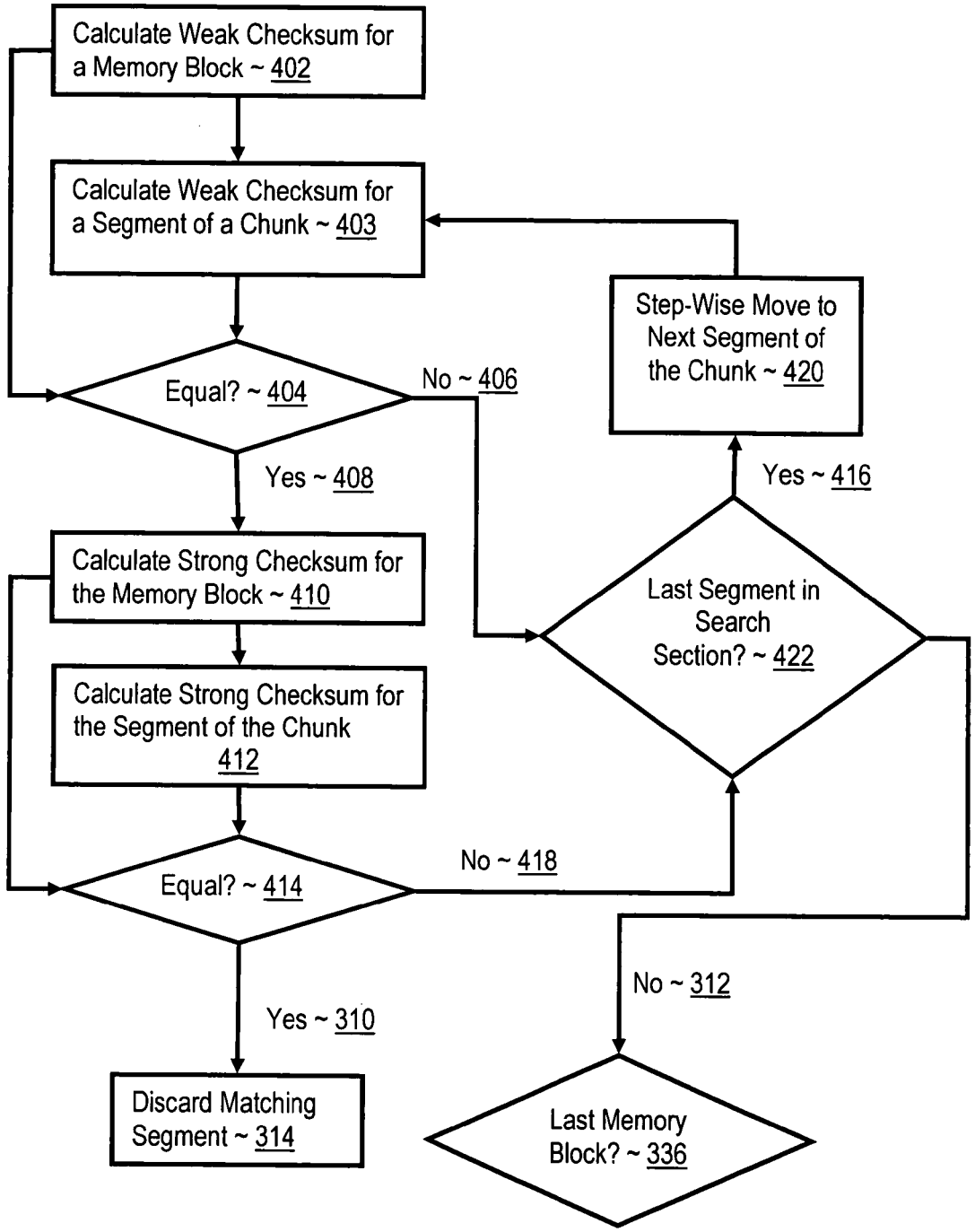
FIG. 6 sets forth a flow chart that illustrates an exemplary method of searching at a repeating memory interval through a search section of a chunk for a segment of the chunk that matches a memory block.

Searching (306) for a segment of a chunk that matches a memory block is explained further with reference to FIG. 6. FIG. 6 sets forth a flow chart that illustrates an exemplary method of searching at a repeating memory interval through a search section of the chunk for a segment of the chunk that matches a memory block. The method of FIG. 6 includes calculating (402) a weak checksum for the memory block. A weak checksum may be implemented as any function having a relatively low computational overhead. Lossy linear functions such as the Adler-32 checksum from RFC 2960 and RFC 1950 are useful as weak checksums. Another example of a useful weak checksum is a simple sum of the values of the bits in a memory block.

The method of FIG. 6 also includes calculating (403) weak checksums for segments of the search section of the chunk. Because calculating weak checksums for segments of the search section is often carried out by calculating weak checksums for a series of adjacent, overlapping segments, calculating (403) weak checksums for segments of the search section of the chunk is often carried out by calculating rolling weak checksums. Consider an example of a weak checksum calculated as a rolling sum of the values of the bits in a segment. Assume that the memory block size is 512 bytes and that the segment size for segments in a chunk is also therefore 512 bytes. Calculating a rolling weak checksum then is carried out by summing the values of bits 1–4096 for the first segment in the search section of the chunk to establish a rolling weak checksum. Then the weak checksum for the second segment is calculated by subtracting from the rolling weak checksum the value of bit 1 and adding the value of bit 4097. The weak checksum for the third segment is calculated by subtracting from the rolling weak checksum the value of bit 2 and adding the value of bit 4098. The weak checksum for the fourth segment is calculated by subtracting from the rolling weak checksum the value of bit 3 and adding the value of bit 4099, continuing until a match is found or for all the segments in the search section of a chunk if no match is found.

The method of FIG. 6 also includes comparing (404) the weak checksums for the segments with the checksum for the memory block. When a segment's weak checksum is found not equal to the weak checksum of the memory block (406), processing continues in the method of FIG. 6 by determining (422) whether there are more segments in the chunk to be compared with the current memory block, and, if so (416), moving (420) to the next segment, calculating a weak checksum for the next segment (403), comparing (404) that weak checksum with the weak checksum for the memory block, and so on.

Weak checksums do not uniquely identify a chunk segment or a memory block, and a positive comparison therefore identifies a probable match between a memory block and a segment of a chunk but does not conclusively determine a match. Weak checksums are used to exclude non-matching segments with small computational overhead. When a candidate segment is found with a matching weak checksum, however, a stronger calculation is needed to determine whether a true match exists. If a segment is found with a weak checksum equal to the weak checksum of the memory block (408), therefore, the method of FIG. 6 includes calculating (410) a strong checksum for the memory block. A strong checksum is a function that when applied to the contents of a memory block or chunk segment yields a result that is unique to a high degree of probability. Examples of strong checksums include one-way hashing functions such as SHA and MD5. SHA is the 'Secure Hash Algorithm,' an algorithm designed for use with the Digital Signature Standard (DSS), a cryptographic standard of National Institute of Standards and Technology (NIST) and the National Security Agency (NSA). MD5 is the Messaging Digest algorithm number 5, developed by Ronald Rivest and promulgated as a standard in RFC1321 from the Internet Engineering Task Force. These examples are for explanation, not for limitation. In fact, it is well within the scope of the present invention to use any strong checksum function as will occur to those of skill in the art.

The method of FIG. 6 also includes calculating (412) a strong checksum for the segment with the matching weak checksum and comparing (414) the strong checksum of the memory block and the strong checksum for the segment with the equal weak checksum. Because many such comparisons will typically be calculated in a loop, in many embodiments, calculating (410) a strong checksum for the memory block comprises calculating a static strong checksum for the memory block, thereby calculating the strong checksum for the memory block only once even if a looping series of comparisons produces multiple candidates with equal weak checksums for comparison.

The method of FIG. 6 includes determining (310) that the search has found a segment having contents that match the contents of the memory block if the strong checksum of the memory block and the strong checksum for the segment with the matching weak checksum are equal. When such a match is found, processing continues in this example with discarding the matching segment (314), providing a key for the memory block (316), and so on, according to the exemplary method of FIG. 3. If in comparing (414) the strong checksum of the memory block and the strong checksum for the segment with the equal weak checksum no match is found (418), processing continues in the method of FIG. 6 by determining (422) whether there are more segments in the chunk to be compared with the current memory block, and, if so (416), moving (420) to the next segment, calculating a weak checksum for the next segment (403), comparing (404) that weak checksum with the weak checksum for the memory block, and so on.

Finding no match (418) in comparing (414) the strong checksum of the memory block and the strong checksum for the segment with the equal weak checksum when there are no more segments in the chunk to be compared with the current memory block (312) is taken as a determination of no matching segment in the chunk for the memory block under comparison. In this circumstance processing continues, in the method of FIG. 3, for example, with determining (336) whether there are more memory blocks to be retrieved from memory and compared with segments of the chunk, and so on, as discussed below in more detail.

In the method of FIG. 3, if, in searching (306) for a segment of a chunk that matches a memory block, a matching segment is found (310), the method includes discarding (314) the matching segment and providing (316) a retrieval key for the memory block as a retrieval key for the matching segment. It is useful to discard the matching segment because the fact that it matches the memory block under comparison means that one instance of the matching segment is already stored in memory and already has a retrieval key associated with it. The method advantageously includes providing (316) a retrieval key for the memory block as a retrieval key for the matching segment because the matching segment and the memory block are identical. In fact, this is a useful example of memory compression achieved by storing these identical contents only once in semi-persistent computer memory. Any memory client wishing to retrieve those contents is provided the same key regardless of where in any data stream, data structure, chunk, or other aggregation of computer data those contents occur.

When a matching segment is found, the method of FIG. 3 includes identifying (318) an unmatched portion of the chunk that does not match the memory block, identifying (319) a free memory block of a file system, storing (320) the unmatched portion semi-persistently in the free memory block, and providing (322) a retrieval key for the unmatched portion. In fact, by comparison with matched segments which are discarded without being stored in memory, this unmatched portion of a chunk is a portion of an input data stream that is stored in memory. The method of FIG. 3 implements variable memory block size by storing the unmatched portion of the chunk in a free memory block of a file system as a new memory block in semi-persistent computer memory. The new memory block has a memory block size equal to the size of the unmatched portion of the chunk. The memory block size varies because the size of an unmatched portion of a chunk varies from match to match.

In the method of FIG. 3, storing (320) the unmatched portion semi-persistently in the free memory block is carried out by storing the unmatched portion without recording the use of the free memory block in the file system. More particularly, in the method of FIG. 3, identifying (318) a free memory block of a file system may be carried out by reading a block identification from a free block list of a file system, and storing (320) the unmatched portion semi-persistently in the free memory block may include leaving the block identification unchanged in the free block list of the file system. In other words, the file system never knows that semi-persistent memory has used a free memory block from the file system; the file system retains an identification of the free memory block in its meta-data; and the file system retains the power to use the free memory block at any time by overwriting its contents with file data. This is the sense in which a semi-persistent memory is semi-persistent: in that its contents are written to a memory device that provides persistent memory but are written with no assurance of not being overwritten.

In the method of FIG. 3, providing (322) a retrieval key for the unmatched portion of a chunk may be carried out by calculating a weak checksum for the unmatched portion of the chunk, calculating a strong checksum for the unmatched portion of the chunk, and using a combination of the two checksums as a retrieval key. Using a key derived from memory contents as a retrieval key advantageously makes it possible to verify memory contents by use of such a key.

Processing components of a chunk when a match is found is explained with reference to FIG. 3 and FIG. 4. In the method of FIG. 3, when processing continues after finding a matching segment (310) and providing a key for an unmatched portion of a chunk (322), providing (302) a chunk, that is, a next chunk for continued processing, may be carried out by retrieving from input a quantity of data equal in size to the sum of the sizes of the matching segment (204 on FIG. 4) and the unmatched portion (206) and concatenating the retrieved input quantity to a remaining portion (216) of the chunk that remains after discarding the matching segment (204) and storing the unmatched portion (206) in semi-persistent memory.

Processing components of a chunk in the method of FIG. 3 when no match is found is explained with reference to FIG. 3 and FIG. 5. In the method of FIG. 3, when searching (306) for a segment of the chunk that matches the memory block fails to find a matching segment (312), the method includes repeatedly carrying out the following steps for all memory blocks in semi-persistent computer memory until a matching segment is found (310): retrieving (332) a next memory block from semi-persistent computer memory (324) and searching (306) for a segment of the chunk that matches the next memory block. If no matching segment is found in any memory block in semi-persistent computer memory (342), the method of FIG. 3 includes identifying (325) a free memory block of a file system, storing (326) a search section (208 on FIG. 5) of the chunk (210) semi-persistently in the free memory block, and providing (328) a retrieval key for the search section of the chunk. In the method of FIG. 3, storing (326) the search section (208 on FIG. 5) of the chunk (210) typically is carried out by storing the search section of the chunk in a free memory block (298) of a file system as a new memory block in semi-persistent computer memory (324) having a memory block size equal to the size of the search section of the chunk. Because a search section (208) of a chunk may be as large as the maximum size of memory block permitted in semi-persistent memory, the maximum memory block size in semi-persistent memory, in many embodiments, is advantageously selected so that a free memory block of a file system has a block size at least as large as a maximum memory block size of semi-persistent computer memory.

In the method of FIG. 3, providing (328) a retrieval key for a search section of a chunk typically includes calculating a weak checksum for the search section of the chunk and calculating a strong checksum for the search section of the chunk. When no match is found (312) and there are no further memory blocks for comparison (342), providing (302) a chunk, that is, providing a next chunk for further processing of an input stream, may be carried out by retrieving from input a quantity of data equal in size to the search section (208) concatenating the retrieved input quantity to the remaining portion (216) of the chunk that remains after storing the search section in semi-persistent memory.

Figure 7:
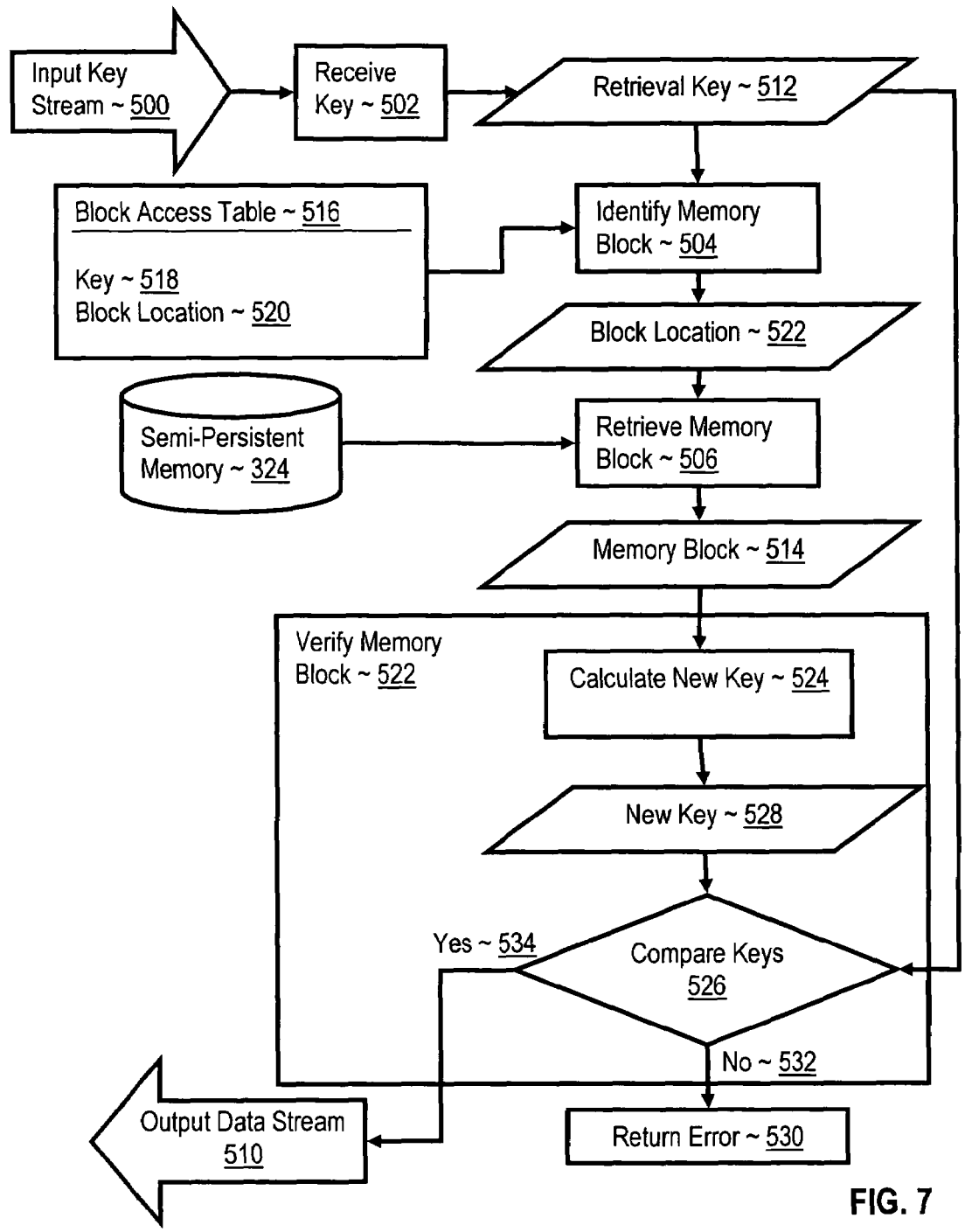
FIG. 7 sets forth a flow chart illustrating an exemplary method of reading data from memory according to embodiments of the present invention.

Methods, systems, and products of content addressable data storage and compression for semi-persistent computer memory according to embodiments of the present invention support not only writing data to memory but also usefully support reading data from memory. FIG. 7 sets forth a flow chart illustrating an exemplary method of reading data from memory according to embodiments of the present invention. The method of FIG. 7 includes receiving (502) a retrieval key (512). Receiving (502) a retrieval key (512) is typically implemented by receiving a retrieval key in a memory management system of content addressable data storage and compression for semi-persistent computer memory as described in detail above in this specification. The retrieval key in the method of FIG. 7 is a retrieval key that identifies a memory block, where the retrieval key was created for the block as described above in this specification. In addition, the retrieval key (512) for the memory block (506) in the method of FIG. 7 is a unique key calculated with an algorithm that generates a unique key from the contents of a memory block. Algorithms capable of generating a unique key from the contents of a memory block include MD5, SHA, and others as will occur to those of skill in the art.

The method of FIG. 7 also includes identifying (504) a memory block in dependence upon the retrieval key (512) and retrieving (506) the identified memory block (514) for return to a reading memory client. The identified memory block in this example is a block identified in dependence upon the retrieval key. In the example of FIG. 7, a memory management system according to an embodiment of the present invention maintains a table called a Block Access Table (516) that relates retrieval keys (518) to memory block locations (520) in semi-persistent computer memory. In an example of a file system, a memory block location for a memory block having no fixed memory block size, although subject to a maximum memory block size, may be implemented, for example, as storage of disk identification, track number, sector number, beginning byte number (offset within a sector), and block size.

The method of FIG. 7 includes verifying (522) the contents of the memory block. Verifying contents of a memory block is determining that the contents of a block of semi-persistent memory have not been overwritten by file system operations. That is, verifying the contents of a memory block is determining that the contents of the block as retrieved from semi-persistent memory are the same as the contents that were written to semi-persistent memory. Verifying the contents of memory blocks is useful in read operations from semi-persistent memory systems according to embodiments of the present invention because such memory blocks are always subject to being overwritten at any time by file system operations.

In the method of FIG. 7, as mentioned, the retrieval key (512) for the memory block (506) is a unique key calculated with an algorithm such as MD5 or SHA that generates a unique key from the contents of a memory block. In the method of FIG. 7, verifying (522) the contents of the memory block further is carried out by calculating (524) a new key for the memory block with the same algorithm and comparing (526) the retrieval key and the new key. If the comparison succeeds (534), the data from the memory block is provided as read output (510) to a calling memory client. If the comparison fails (532), meaning that the contents of the memory block have been altered by file system operations, an error (530) is indicated to the memory client that requested the read operation from semi-persistent memory.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of content addressable data storage and compression for semi-persistent computer memory comprising:

searching at a repeating memory interval through a search section of a chunk for a segment of the chunk that matches a memory block from computer memory, including: calculating a weak checksum for the memory block; calculating rolling weak checksums for segments of the search section of the chunk; comparing the rolling weak checksums for the segments with the checksum for the memory block; and if a segment is found with a rolling weak checksum equal to the weak checksum of the memory block; calculating a strong checksum for the memory block; calculating a strong checksum for the segment with the matching rolling weak checksum; comparing the strong checksum of the memory block and the strong checksum for the segment with the equal rolling weak checksum;

determining that the search has found a segment having contents that match the contents of the memory block if the strong checksum of the memory block and the strong checksum for the segment with the matching rolling weak checksum are equal;

if a matching segment is found:

discarding the matching segment;

providing a retrieval key for the memory block as a retrieval key for the matching segment;

identifying an unmatched portion of the chunk that does not match the memory block;

identifying a free memory block of a file system;

storing the unmatched portion semi-persistently in the free memory block; and providing a retrieval key for the unmatched portion.

2. The method of claim 1 wherein a free memory block of a file system has a block size at least as large as a maximum memory block size.

3. The method of claim 1 wherein storing the unmatched portion semi-persistently in the free memory block comprises storing the unmatched portion without recording the use of the free memory block in the file system.

4. The method of claim 1 wherein:

identifying a free memory block of a file system comprises reading a block identification from a free block list of a file system, and storing the unmatched portion semi-persistently in the free memory block comprises leaving the block identification unchanged in the free block list of the file system.

5. The method of claim 1 wherein storing the unmatched portion of the chunk comprises storing the unmatched portion of the chunk as a new memory block having a memory block size equal to the size of the unmatched portion of the chunk.

6. The method of claim 1 wherein searching for a segment of the chunk that matches the memory block fails to find a matching segment, the method further comprising repeatedly carrying out the following steps for all memory blocks in computer memory until a matching segment is found:
- retrieving a next memory block from computer memory; and
- searching for a segment of the chunk that matches the next memory block.

7. The method of claim 6 wherein no matching segment is found in any memory block in computer memory, the method further comprising:
- identifying a free memory block of a file system;
- storing a search section of the chunk semi-persistently in the free memory block; and
- providing a retrieval key for the search section of the chunk.

8. The method of claim 6 wherein storing a search section of the chunk comprises storing the search section of the chunk as a new memory block having a memory block size equal to the size of the search section of the chunk.

9. The method of claim 6 wherein providing a retrieval key for a search section of a chunk comprises:
- calculating a weak checksum for the search section of the chunk; and
- calculating a strong checksum for the search section of the chunk.

10. The method of claim 1 further comprising:
- receiving a retrieval key;
- identifying a memory block in dependence upon the retrieval key;
- retrieving the identified memory block; and
- verifying the contents of the memory block.

11. The method of claim 10 wherein the retrieval key for the memory block comprises a unique key calculated with an algorithm that generates a unique key from the contents of a memory block, and verifying the contents of the memory block further comprises:
- calculating a new key for the memory block with the same algorithm; and
- comparing the retrieval key and the new key.

12. A system for content addressable data storage and compression for semi-persistent computer memory comprising:
- means for searching at a repeating memory interval through a search section of a chunk for a segment of the chunk that matches a memory block from computer memory, including means for: calculating a weak checksum for the memory block; calculating rolling weak checksums for segments of the search section of the chunk; comparing the rolling weak checksums for the segments with the checksum for the memory block; and if a segment is found with a rolling weak checksum equal to the weak checksum of the memory block; calculating a strong checksum for the memory block; calculating a strong checksum for the segment with the matching rolling weak checksum; comparing the strong checksum of the memory block and the strong checksum for the segment with the equal rolling weak checksum;
- means for determining that the search has found a segment having contents that match the contents of the memory block if the strong checksum of the memory block and the strong checksum for the segment with the matching rolling weak checksum are equal;
- means for discarding a matching segment;
- means for providing a retrieval key for the memory block as a retrieval key for the matching segment;
- means for identifying an unmatched portion of the chunk that does not match the memory block;
- means for identifying a free memory block of a file system;
- means for storing the unmatched portion semi-persistently in the free memory block; and
- means for providing a retrieval key for the unmatched portion.

13. The system of claim 12 wherein a free memory block of a file system has a block size at least as large as a maximum memory block size.

14. The system of claim 12 wherein means for storing the unmatched portion semi-persistently in the free memory block comprises means for storing the unmatched portion without recording the use of the free memory block in the file system.

15. The system of claim 12 wherein:
- means for identifying a free memory block of a file system comprises means for reading a block identification from a free block list of a file system, and
- means for storing the unmatched portion semi-persistently in the free memory block comprises means for leaving the block identification unchanged in the free block list of the file system.

16. The system of claim 12 wherein means for storing the unmatched portion of the chunk comprises means for storing the unmatched portion of the chunk as a new memory block having a memory block size equal to the size of the unmatched portion of the chunk.

17. The system of claim 12 wherein means for searching for a segment of the chunk that matches the memory block fails to find a matching segment, the system further comprising means for repeatedly carrying out the following steps for all memory blocks in computer memory until a matching segment is found:
- retrieving a next memory block from computer memory; and
- searching for a segment of the chunk that matches the next memory block.

18. The system of claim 17 further comprising:
- means for identifying a free memory block of a file system;
- means for storing a search section of the chunk semi-persistently in the free memory block; and
- means for providing a retrieval key for the search section of the chunk.

19. The system of claim 17 wherein means for storing a search section of the chunk comprises means for storing the search section of the chunk as a new memory block having a memory block size equal to the size of the search section of the chunk.

20. The system of claim 17 wherein means for providing a retrieval key for a search section of a chunk comprises:
- means for calculating a weak checksum for the search section of the chunk; and
- means for calculating a strong checksum for the search section of the chunk.

21. The system of claim 12 further comprising:
- means for receiving a retrieval key;
- means for identifying a memory block in dependence upon the retrieval key;
- means for retrieving the identified memory block; and
- means for verifying the contents of the memory block.

22. The system of claim 21 wherein the retrieval key for the memory block comprises a unique key calculated with an algorithm that generates a unique key from the contents of a memory block, and means for verifying the contents of the memory block further comprises:
- means for calculating a new key for the memory block with the same algorithm; and
- means for comparing the retrieval key and the new key.

23. A computer program product for content addressable data storage and compression for semi-persistent computer memory comprising:
a recording medium;
means, recorded on the recording medium, for searching at a repeating memory interval through a search section of a chunk for a segment of the chunk that matches a memory block from computer memory, including means, recorded on the recording medium, for: calculating weak checksum for the memory block; calculating rolling weak checksums for segments of the search section of the chunk; comparing the rolling weak checksums for the segments with the checksum for the memory block; and if a segment is found with a rolling weak checksum equal to the weak checksum of the memory block; calculating a strong checksum for the memory block; calculating a strong checksum for the segment with the matching rolling weak checksum; comparing the strong checksum of the memory block and the strong checksum for the segment with the equal rolling weak checksum;
means, recorded on the recording medium, for determining that the search has found a segment having contents that match the contents of the memory block if the strong checksum of the memory block and the strong checksum for the segment with the matching rolling weak checksum are equal;
means, recorded on the recording medium, for discarding a matching segment;
means, recorded on the recording medium, for providing a retrieval key for the memory block as a retrieval key for the matching segment;
means, recorded on the recording medium, for identifying an unmatched portion of the chunk that does not match the memory block;
means, recorded on the recording medium, for identifying a free memory block of a file computer program product;
means, recorded on the recording medium, for storing the unmatched portion semi-persistently in the free memory block; and
means, recorded on the recording medium, for providing a retrieval key for the unmatched portion.

24. The computer program product of claim 23 wherein a free memory block of a file computer program product has a block size at least as large as a maximum memory block size.

25. The computer program product of claim 23 wherein means, recorded on the recording medium, for storing the unmatched portion semi-persistently in the free memory block comprises means, recorded on the recording medium, for storing the unmatched portion without recording the use of the free memory block in the file computer program product.

26. The computer program product of claim 23 wherein:
means, recorded on the recording medium, for identifying a free memory block of a file computer program product comprises means, recorded on the recording medium, for reading a block identification from a free block list of a file computer program product, and
means, recorded on the recording medium, for storing the unmatched portion semi-persistently in the free memory block comprises means, recorded on the recording medium, for leaving the block identification unchanged in the free block list of the file computer program product.

27. The computer program product of claim 23 wherein means, recorded on the recording medium, for storing the unmatched portion of the chunk comprises means, recorded on the recording medium, for storing the unmatched portion of the chunk as a new memory block having a memory block size equal to the size of the unmatched portion of the chunk.

28. The computer program product of claim 23 wherein means, recorded on the recording medium, for searching for a segment of the chunk that matches the memory block fails to find a matching segment, the computer program product further comprising means, recorded on the recording medium, for repeatedly carrying out the following steps for all memory blocks in computer memory until a matching segment is found:
retrieving a next memory block from computer memory; and
searching for a segment of the chunk that matches the next memory block.

29. The computer program product of claim 28 further comprising:
means, recorded on the recording medium, for identifying a free memory block of a file computer program product;
means, recorded on the recording medium, for storing a search section of the chunk semi-persistently in the free memory block; and
means, recorded on the recording medium, for providing a retrieval key for the search section of the chunk.

30. The computer program product of claim 28 wherein means, recorded on the recording medium, for storing a search section of the chunk comprises means, recorded on the recording medium, for storing the search section of the chunk as a new memory block having a memory block size equal to the size of the search section of the chunk.

31. The computer program product of claim 28 wherein means, recorded on the recording medium, for providing a retrieval key for a search section of a chunk comprises:
means, recorded on the recording medium, for calculating a weak checksum for the search section of the chunk; and
means, recorded on the recording medium, for calculating a strong checksum for the search section of the chunk.

32. The computer program product of claim 23 further comprising:
means, recorded on the recording medium, for receiving a retrieval key;
means, recorded on the recording medium, for identifying a memory block in dependence upon the retrieval key;
means, recorded on the recording medium, for retrieving the identified memory block; and
means, recorded on the recording medium, for verifying the contents of the memory block.

33. The computer program product of claim 32 wherein the retrieval key for the memory block comprises a unique key calculated with an algorithm that generates a unique key from the contents of a memory block, and means, recorded on the recording medium, for verifying the contents of the memory block further comprises:
means, recorded on the recording medium, for calculating a new key for the memory block with the same algorithm; and
means, recorded on the recording medium, for comparing the retrieval key and the new key.

* * * * *